United States Patent Office 3,341,546
Patented Sept. 12, 1967

3,341,546
2-(2'-PYRIDYLOXY)ETHYL GUANIDINE DERIVATIVES
William F. Minor, Fayetteville, N.Y., assignor to Bristol-Myers Company, New York, N.Y., a corporation of Delaware
No Drawing. Filed Mar. 18, 1965, Ser. No. 440,947
11 Claims. (Cl. 260—296)

This invention relates to a novel series of nontoxic antidepressant agents which counteract psychic depression without stimulating motor activity or appearing to stimulate the central nervous system and, more particularly to 2-(2'-pyridyloxy)ethylguanidine and its N-alkylated derivatives and their nontoxic, pharmaceutically acceptable acid addition salts.

It was the object of the present invention to provide novel nontoxic antidepressant agents whose use would not be restricted by their exhibition of other pharmacological activity, e.g. hypotensive action, inhibition of mono-amine oxidase. Thus, the hypotensive or the diuretic action frequently exhibited by previously investigated guanidines is highly undesirable in an antidepressant agent.

The object of the present invention has been achieved by the provision, according to the present invention, of a member selected from the group consisting of bases of the formula

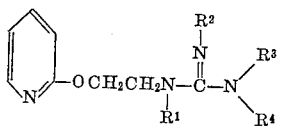

in which $R^1$, $R^2$, $R^3$ and $R^4$ each represent a member selected from the group consisting of hydrogen and (lower)alkyl; and the nontoxic, pharmaceutically acceptable acid addition salts thereof.

A preferred embodiment of the present invention consists of the salt and free base forms of the compounds of the formula

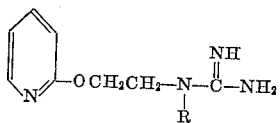

wherein R represents (lower)alkyl.

Another preferred series of compounds of the present invention is that of the compounds of the formula

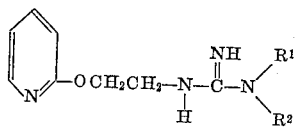

in which each of $R^1$ and $R^2$ is (lower)alkyl, which may be the same or different.

The compounds of the present invention are best prepared from commercially available 2-(2'-aminoethoxy)-pyridine (Aldrich Chemical Co.) or a 2-[2'-(lower)alkyl-aminoethoxy]-pyridine by reacting it with a 2-methyl-2-thiopseudourea or a cyanamide or a 3,5-dimethyl-1-guanylpyrazole (also called a 3,5-dimethylpyrazole-1-carboxamidine) as illustrated by the following equations:

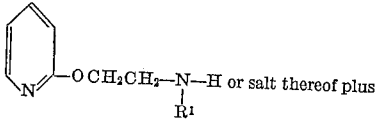

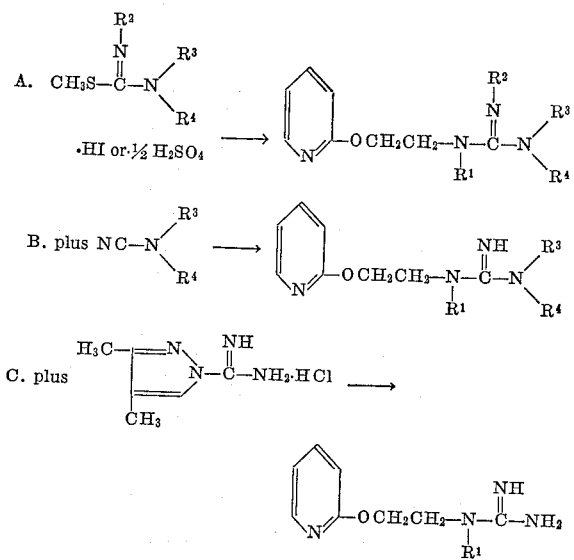

wherein $R^1$, $R^2$, $R^3$ and $R^4$ are each either hydrogen or (lower)alkyl and the products are recovered as the free base or acid addition salt depending upon the procedure used for their isolation.

The use of method A includes the corresponding substituted 2-methyl-2-thiopseudoureas (also called S-methyl isothioureas) prepared by the reaction of a (lower)alkyl iodide or a di(lower)alkyl sulfate with, for example, N-methylthiourea, N-n-butylthiourea, N,N'-diethylthiourea, N,N,N'-trimethylthiourea. In a useful procedure equimolar amounts of the amine and 2-methyl-2-thiopseudourea sulfate or hydriodide in water or ethanol are heated under reflux for several hours or allowed to stand at room temperature overnight. The higher temperatures are preferred where $R^1$ is (lower)alkyl. The product is recovered by removal of the solvent in vacuo. The necessary thiopseudoureas (also called isothioureas) can be made as follows:

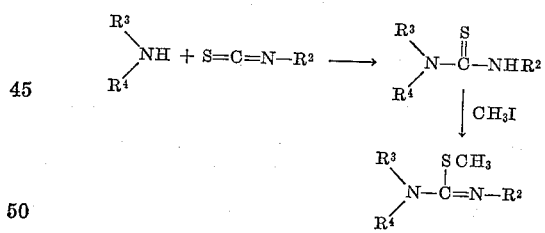

wherein R, $R^3$ and $R^4$ are each hydrogen or (lower)alkyl. (See Organic Syntheses III, 363 and British Patent 973,882.) These S-methylpseudothioureas may be replaced by O-methylpseudoureas.

The use of method B includes substituted cyanamides which are prepared as reported in the literature and especially by the reaction in equivalent amounts in a solvent such as diethyl ether of cyanogen chloride or cyanogen bromide with an amine of the formula

wherein $R^3$ and $R^4$ are each hydrogen or (lower)-alkyl. Exemplary conditions include refluxing equimolar amounts of the amine and the cyanimide in water, as for six hours with recovery as above.

In using method C the reaction may be carried out by fusing the reactants or by heating them in the presence of a diluent such as an alkanol, e.g. ethanol, and advantageously with the exclusion of carbon dioxide by performing the reaction in an inert atmosphere, e.g. under nitrogen.

The 2-[2'-(lower)alkylaminoethoxy]pyridines used in the above reactions are prepared, for example, by the following process:

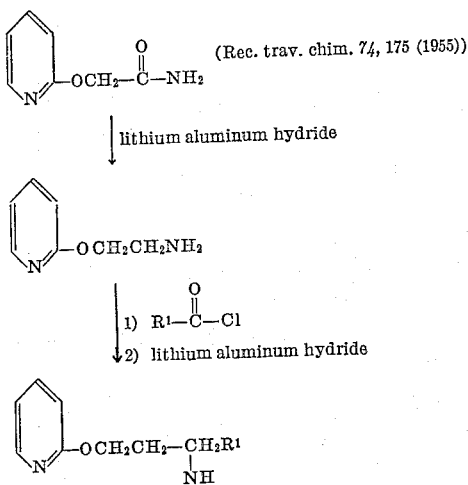

wherein R¹ represents hydrogen or (lower)alkyl.

Included within the present invention are the acid addition salts prepared by reaction of these basic compounds with organic and inorganic acids such as hydrochloric acid, hydrobromic acid, sulfuric acid, phosphoric acid, acetic acid, maleic acid, tartaric acid, citric acid, sulfamic acid, glycolic acid, succinic acid, ascorbic acid and the like.

The term "(lower)alkyl" as used herein refers to straight and branched chain saturated monovalent aliphatic hydrocarbon radicals having from one to ten carbon atoms inclusive, e.g. methyl, ethyl, propyl, isopropyl, butyl, normal and secondary and tertiary butyl, amyl, decyl, etc.

For use as antidepressant agents, these compounds are associated with a significant amount of a pharmaceutically acceptable carrier which may be either a solid material or a liquid. The compositions may take the form of tablets, effervescent tablets, powder, granules, capsules (both hard and soft shell capsules), or suspensions in edible oils, or other dosage forms which are particularly useful for oral ingestion. Liquid diluents are employed in sterile conditions for parenteral use, that is by intramusclar, intravenous and intraperitoneal injection. Such a medium may be a sterile solvent or suspending agent such as water or an injectable oil. The compositions may take the form of active material admixed with solid diluents and/or tabletting adjuvants such as corn starch, lactose, talc, stearic acid, magnesium stearate, gums or the like. Any of the encapsulating or tabletting materials used in pharmaceutical practice may be employed where there is no incompatibility with the compounds. The materials may be tabletted with or without adjuvants. Alternatively, the compounds may be placed in the usual capsule or resorbable material such as the usual gelatin capsule and administered in that form. In yet another embodiment, the compounds may be put up as a powder and so employed, as by nasal inhalation, or the compounds may be prepared in the form of a palatable suspension in which the compounds are not soluble. Suspensions may be given orally as made or may be encapsulated. Ointments and lotions are useful topically; use for topical therapy is made of nose drops, troches and suppositories. The compounds of the present invention are particularly useful when given by the oral, intramuscular, or intravenous routes; a useful dosage range in man is about 10–1000 mgs. per dose. Dosages are given about one to six times per day, depending on the patient, the infection, the route of administration and the like.

The percentage of active ingredients in these compositions may be varied. It is necessary that the active ingredients constitute a proportion such that a suitable dosage will be obtained. Obviously, several unit dosage forms may be administered at about the same time. Although it is found, particularly on intravenous injection, that a percentage of less than 0.10 percent of the compound is effective, it is perferable to use not less than 0.10 percent of the compounds. Activity increases with the concentration of the compound. The percentage of active agent may be 10 percent, or 25 percent, or even a higher proportion of the substance administered. For example, tablets may be prepared with a minor proportion of diluent and a major proportion of active material. Tablets containing from about 10 to 1000 mgs. of the compound are particularly useful. The solid pharmaceutical carrier used may be an envelope enclosing pure compound in a gelatin capsule.

The following examples will illustrate the present invention without limiting it thereto.

EXAMPLE 1

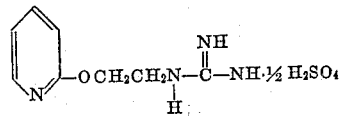

*2-(2'-Pyridyloxy)ethylguanidine sulfate.*—A mixture of 13.8 g. (0.10 mole) of 2-(2'-aminoethoxy)pyridine and 14.0 g. (0.05 mole) of 2-methyl-2-thiopseudourea sulfate in 40 ml. of water was refluxed for 1.5 hours and stored for 17 hours at 25° C. The solution was concentrated to dryness in vacuo and the residue was dissolved in 35 ml. of boiling water and diluted with 100 ml. of acetone to give 15.1 g. (66%) of 2-(2'-pyridyloxy)ethylguanidine sulfate of M.P. 209–211.5° C. An analytical sample was recrystallized again from water.

*Analysis.*—Calc'd for $(C_8H_{12}N_4O)_2H_2SO_4$: C, 41.91; H, 5.72; N, 24.44. Found: C, 42.00; H, 5.86; N, 25.45.

This compound exhibited an oral $LD_{50}$ in mice of about 1000 mg./kg. and at doses of 20 mg./kg. (and even as low as 2.5 mg./kg.) p.o. in the mouse given prior to treatment with 5 mg./kg. reserpine caused the mice to behave normally and prevented the usual sedative effect of reserpine. This is a marked contrast to the results of pretreatment with monoamine oxidase inhibitors before reserpine dosage as in that instance the mice exhibit great motor stimulation and indeed become so hyperactive that death usually results. Thus this compound exhibits marked antidepressant activity without the undesirable motor stimulation of the usual monoamine oxidase inhibitors.

EXAMPLE 2

Substitution in the procedure of Example 1 for the 2-methyl-2-thiopseudourea sulfate used therein of an equimolar weight of the substituted 2-methyl-2-thiopseudoureas of the formulae:

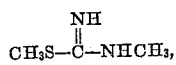

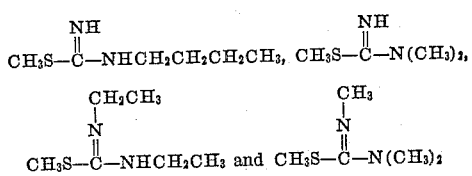

respectively, produces the products of the formulae

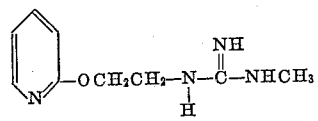

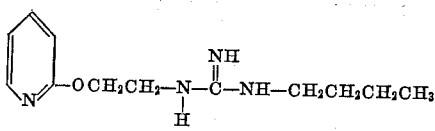

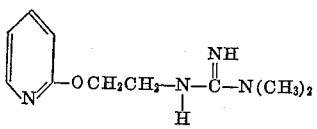

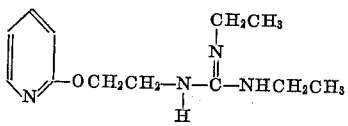

and

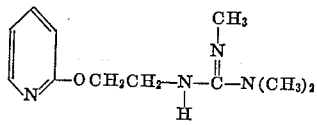

respectively, as their sulfate salts.

EXAMPLE 3

Substitution in the procedure of Example 1 for the 2-(2'-aminoethoxy)pyridine used therein of an equimolar weight of 2-(2'-methylaminoethoxy)pyridine and 2-(2'-ethylaminoethoxy)-pyridine, respectively, produces the compounds of the formulae

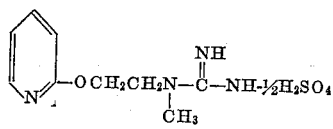

and

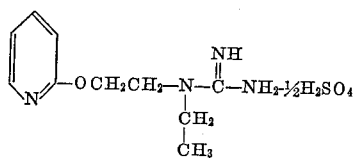

respectively.

EXAMPLE 4

Repetition of the procedures of Example 2 with the replacement of the 2-(2'-aminoethoxy)pyridine used therein with an equimolar weight of 2-(2'-ethylaminoethoxy)pyridine produces the compounds of the following formulae:

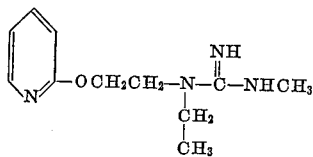

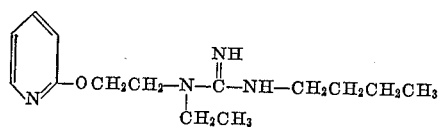

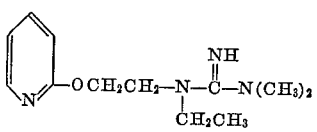

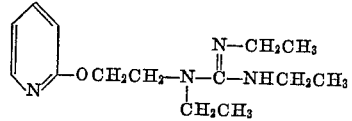

and

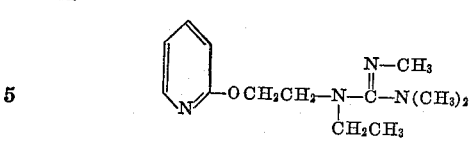

respectively, as their sulfate salts.

The new guanidine compounds of the present invention also form quaternary ammonium compounds, particularly those with lower alkyl halides, e.g., methyl, ethyl, n-propyl or isopropyl chloride, bromide or iodide and the like, di-lower alkyl-sulfates, e.g., dimethyl sulfate, diethyl sulfate and the like, lower alkyl lower alkane sulfonates, e.g., methyl or ethyl methane or ethane sulfonate, or lower alkyl monocyclic carbocyclic aryl sulfonates, e.g., methyl p-toluene sulfonate, and the like, as well as the corresponding quaternary ammonium hydroxides and the salts, which may be formed from the quaternary ammonium hydroxides by the reaction with inorganic acids other than the hydrohalic acids or with organic acids, such as those outlined above for the preparation of the acid addition salts.

The quaternary ammonium compounds may be obtained by reacting a free base with a lower alkyl halide, e.g., methyl, ethyl, n-propyl, isopropyl chloride, bromide or iodide and the like, a di-lower alkyl-sulfate, e.g., dimethyl sulfate, diethyl sulfate and the like, a lower alkyl lower alkane sulfonate, e.g., methyl or ethyl methane or ethane sulfonate and the like, or a lower alkyl monocyclic carbocyclic aryl sulfonate, e.g., methyl p-toluene sulfonate and the like. The quaternizing reaction may be performed in the presence of a solvent, such as, for example, a lower alkanol, e.g., methanol, ethanol, propanol, isopropanol, tertiary butanol and the like, a lower alkanone, e.g., acetone, ethyl methyl ketone and the like, or an organic acid amide, e.g., formamide, N,N-dimethylformamide and the like. The resulting quaternary ammonium compounds are effective antiseptic and germicidal agents.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:

1. A member selected from the group consisting of bases of the formula

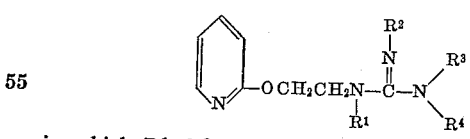

in which $R^1$, $R^2$, $R^3$ and $R^4$ each represent a member selected from the group consisting of hydrogen and (lower)alkyl; and the nontoxic, pharmaceutically acceptable acid addition salts thereof.

2. The compounds of the formula

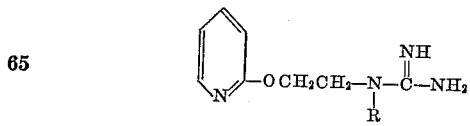

wherein R represents (lower)alkyl.

3. The compounds of the formula

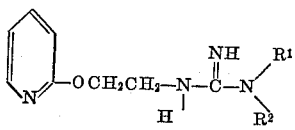

in which each of R¹ and R² is (lower)alkyl.

4. The compounds of the formula

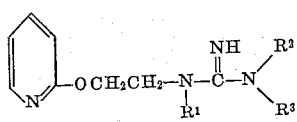

in which R¹, R² and R³ each represent (lower)alkyl.

5. The compounds of the formula

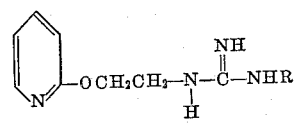

wherein R represents (lower)alkyl.

6. The compound of the formula

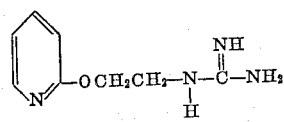

7. The compound of the formula

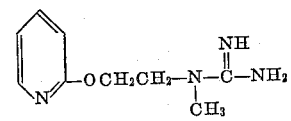

8. The compound of the formula

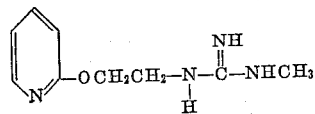

9. The compound of the formula

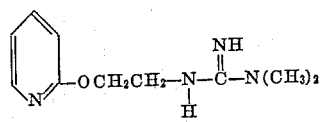

10. The compound of the formula

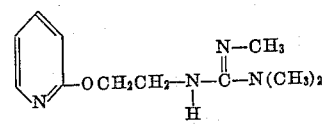

11. The compound of the formula

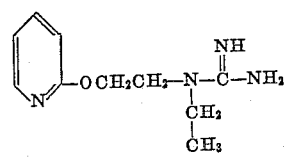

References Cited

UNITED STATES PATENTS

| 3,098,066 | 7/1963 | Mull | 260—239 |
| 3,174,997 | 3/1965 | Campbell | 260—501 |
| 3,178,443 | 4/1965 | Mull | 260—296 |

OTHER REFERENCES

Mull et al.: J. Org. Chem., vol. 25, pp. 1953–6 (1960).

WALTER A. MODANCE, *Primary Examiner.*

ALAN L. ROTMAN, *Assistant Examiner.*